United States Patent [19]

Lunn et al.

[11] Patent Number: 4,962,427
[45] Date of Patent: Oct. 9, 1990

[54] TV RECEIVER INCLUDING MULTISTANDARD OSD

[75] Inventors: Gerald K. Lunn, Harbour; Hing Y. Tong, Tsuen Wan, both of Hong Kong

[73] Assignee: Motorola Inc., Schuamburg, Ill.

[21] Appl. No.: 340,639

[22] Filed: Apr. 20, 1989

[51] Int. Cl.$^5$ ............ H04N 5/44; H04N 5/272; H04N 7/01; H04N 9/74
[52] U.S. Cl. ............ 358/188; 358/140; 358/22; 358/183
[58] Field of Search ............ 358/140, 141, 188, 23, 358/19, 6, 183, 22; 307/516

[56] References Cited

U.S. PATENT DOCUMENTS

| | | | |
|---|---|---|---|
| 4,607,236 | 8/1986 | LeQueáu | 307/516 |
| 4,661,844 | 4/1987 | Rufray et al. | 358/23 |
| 4,682,209 | 7/1987 | Nillesen | 358/19 |
| 4,802,009 | 1/1989 | Hartmeier | 358/140 |
| 4,816,908 | 3/1989 | Colineau et al. | 358/60 |

*Primary Examiner*—John K. Peng
*Attorney, Agent, or Firm*—Michael D. Bingham

[57] ABSTRACT

A television receiver including a MPU and OSD circuitry on a single chip. The OSD circuitry includes multisystem detection circuitry which counts the number of horizontal lines between vertical flyback pulses to determine the vertical frequency of the received standard signal and measures the time of a horizontal line using a fixed frequency signal to determine the horizontal frequency of the received standard signal and uses this information to control the outputs of a PLL to synchronize the receiver to the received standard. The PLL includes a VCO having a constant offset current applied to the control terminal to prevent alternating phases of the output control signal from the loop phase detector, which alternating phases cause jitter in the display.

13 Claims, 5 Drawing Sheets

TV RECEIVER INCLUDING MULTISTANDARD OSD

The present invention pertains to a television receiver including a microprocessor (MPU) and an on screen display (OSD) and more particularly to a multistandard OSD in conjunction with an MPU.

BACKGROUND OF THE INVENTION

In prior art television receivers a MPU is utilized to control all of the functions, e.g. color, synchronization, etc. An additional chip, which contains all of the OSD circuitry, is coupled to the MPU and provides any on screen displays. Each prior art OSD chip is designed to operate with a specific television receiver, that is it operates at one specific standard. Typical world standards in the television industry include NTSC, PAL, and SECAM. Further, there are many variations on each of these standards, referred to herein as multi-definitions, which multi-definitions include: improved definition TV (IDTV); extended definition TV (EDTV); high definition TV (HDTV); as well as interlace scan and progressive scan.

Because each chip operates on only one standard, a large variety of chips must be manufacture. Also, many functions that can be performed by the MPU must be duplicated in the OSD chip and, consequently, much additional hardware is required thereby raising the cost and size of the OSD chip.

One of the major problems that arises in a multistandard TV is the provision of a multiplicity of clock and synchronizing frequencies. Generally, a plurality of oscillators must be provided, each of which can be synchronized to a different received television signal. The plurality of oscillators requires a great amount of space and expense.

SUMMARY OF THE INVENTION

It is an object of the present invention to provide new and improved multistandard OSD circuitry.

It is a further object of the present invention to provide a new and improved MPU chip including a multistandard OSD circuitry thereon.

These and other objects are realized in a television receiver including a microprocessor and multistandard on screen display circuitry on a single chip.

In a preferred embodiment of the present invention the multistandard OSD circuitry includes a phase locked loop with a phase comparator and a voltage controlled oscillator therein. The output of the phase comparator is applied to control the frequency of the voltage controlled oscillator, along with a predetermined offset voltage which is applied to substantially remove jitter in the on screen display. The phase locked loop provides a plurality of clock or synchronizing signals to the remainder of the OSD circuitry.

The preferred embodiment further includes a multi-system detection circuit that counts the number of horizontal lines in a field and senses the horizontal and vertical scanning frequencies. With this information the multi-system detection circuit determines the standard being received, as well as the specific definition, and controls the phase locked loop to provide the correct clock or synchronizing signals.

BRIEF DESCRIPTION OF THE DRAWINGS

Referring to the drawings wherein like characters indicate like components throughout the figures.

DETAILED DESCRIPTION OF THE PREFERRED EMBODIMENT

Figure 1:
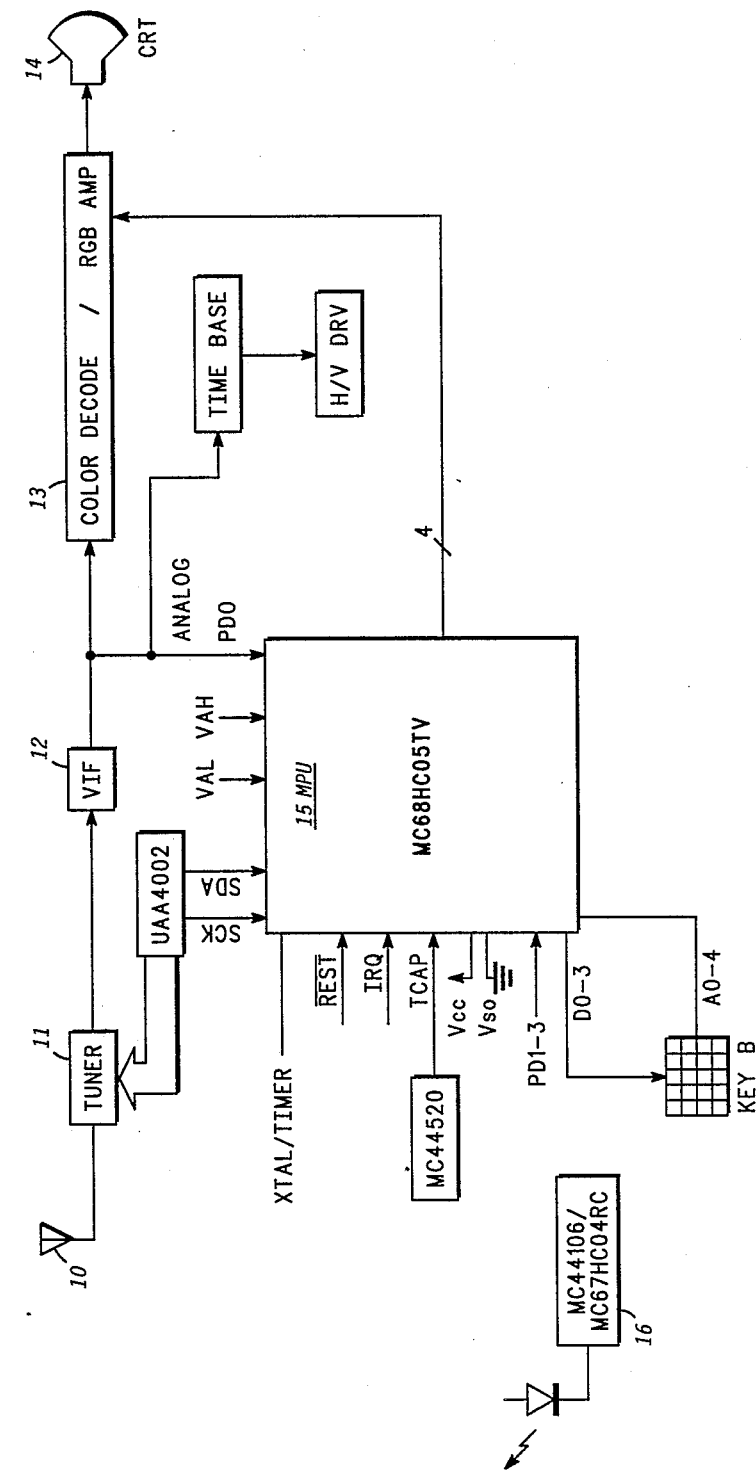
FIG. 1 is a block/schematic diagram of a television receiver embodying the present invention.

Referring specifically to FIG. 1, a multistandard television receiver is illustrated embodying the present invention. Throughout this description, the term "multistandard" refers to the various world standard television systems (e.g. NTSC, PAL, SECAM, etc.) as well as any or all of the various multi-definition systems (IDTV, EDTV, HDTV, interlace scan, progressive scan, etc.). The television receiver includes an antenna 10, a tuner 11, IF 12, color decoder 13, CRT 14, and MPU 15. As is well known in the art, MPU 15 controls the channel (or operating frequency), the color of the display, and all other controllable features such as brightness, volume, etc. A remote unit 16 communicates with MPU 15 for remote control of many controllable features. Only the basic components are illustrated in FIG. 1 and many well known peripheral components have been omitted for simplicity.

Figure 2:
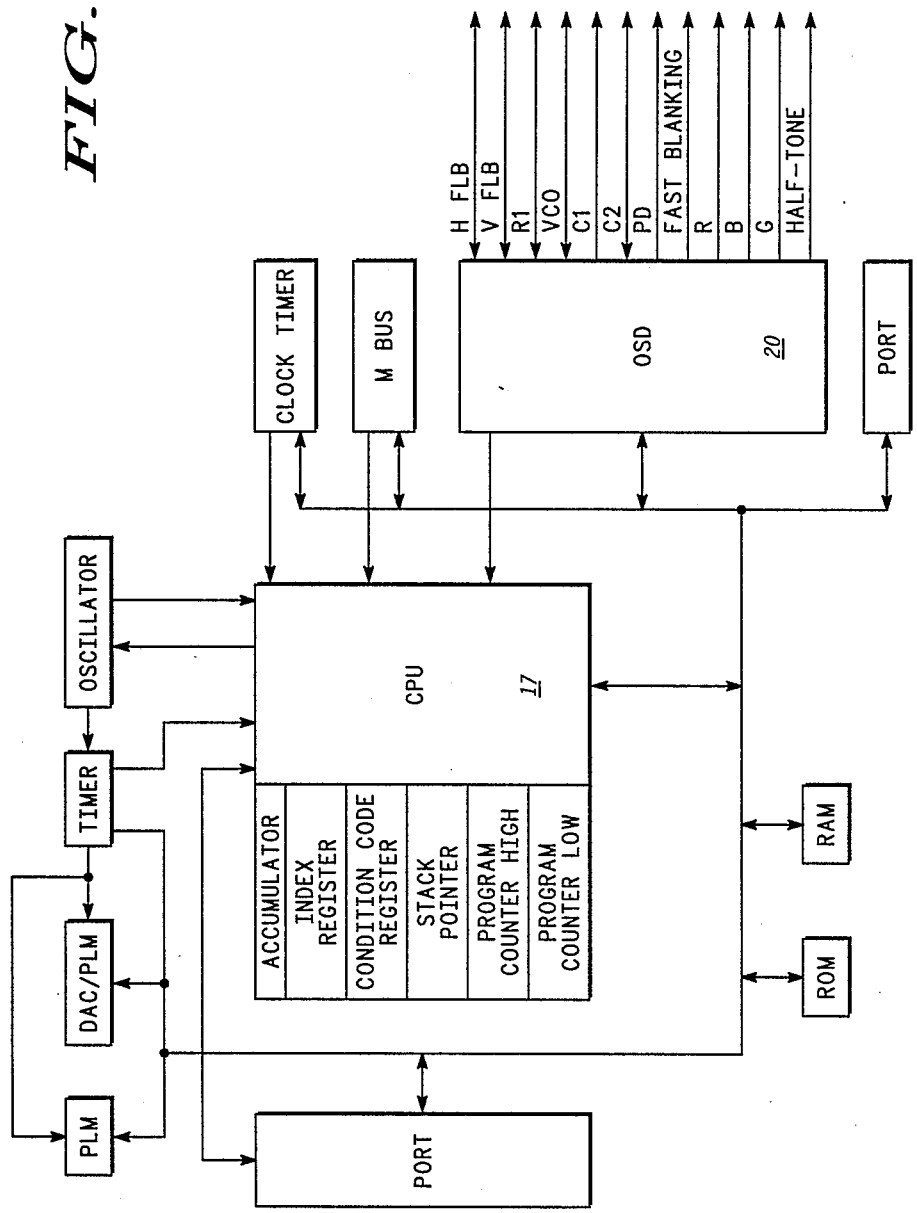
FIG. 2 is a more detailed block diagram/flow chart of the improved microprocessor illustrated in FIG. 1.

FIG. 2 illustrates a more detailed block diagram of MPU 15 with the various components, which in this specific embodiment are all formed on a single semiconductor chip. FIG. 2 also illustrates inputs and outputs to MPU 15, many of whihc will not be described in detail herein because they are well known to those skilled in the art. The main components of MPU 15 to be discussed herein are a CPU 17 and multistandard on screen display (OSD) circuitry 20.

Figure 3:
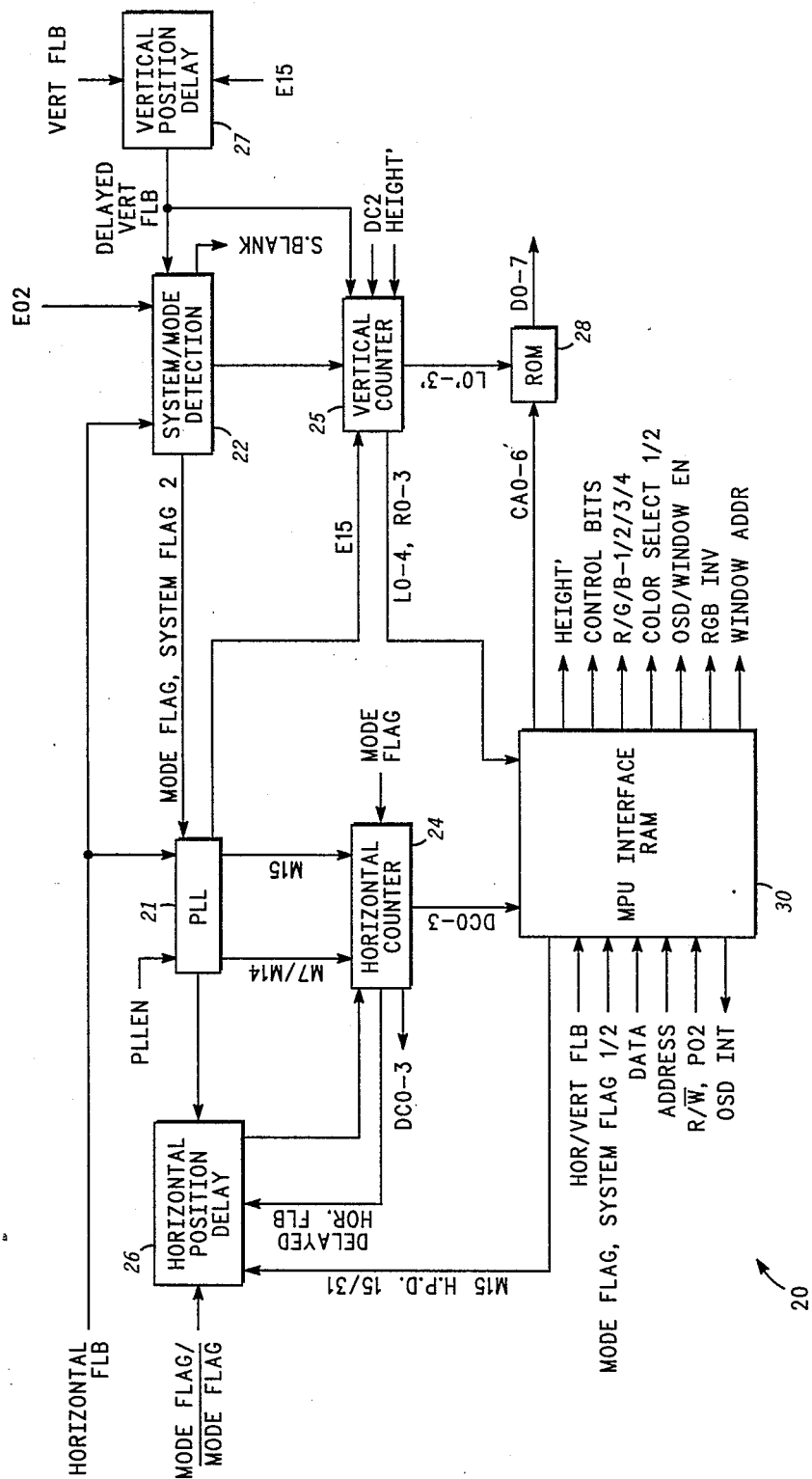
FIG. 3 is a more detailed block diagram/flow chart of the OSD circuitry of FIG. 2.

A more detailed block diagram of multistandard OSD circuitry 20 is illustrated in FIG. 3. Circuitry 20 includes a phase locked loop (PLL) 21, a system/mode detection circuit 22, horizontal and vertical counters 24 and 25, respectively, horizontal and vertical position delay circuits 26 and 27, respectively, a 64 character ROM 28, and an MPU interface 30. PLL is utilized to sychronize OSD circuitry 20 to any received standard television signal. In the present embodiment the leading edge of the horizontal flyback pulse portion of a received television signal is used to synchronize PLL 21 to the received television signal. The horizontal flyback pulse is also applied to system/mode detection circuit 22. Output signals from PLL 21 are applied to horizontal and vertical counters 24 and 25 and horizontal position delay 26. System/mode detection circuit 22 supplies flags to PLL 21, horizontal position delay 26, horizontal and vertical counters 24 and 25, and MPU interface 30. Horizontal counter 24 supplies output signals to horizontal position delay circuit 26, and MPU interface 30. Vertical counter 25 supplies output signals to ROM 28 and MPU interface 30. Vertical position delay circuit 27 receives vertical flyback pulses from the standard television signal and supplies output signals to system/mode detection circuit 22 and to vertical counter 25. ROM 28 receives signals from MPU interface 30 and supplies signals to remaining portions of OSD circuitry 20 (not illustrated) to generate the predetermined on screen display.

Figure 4:
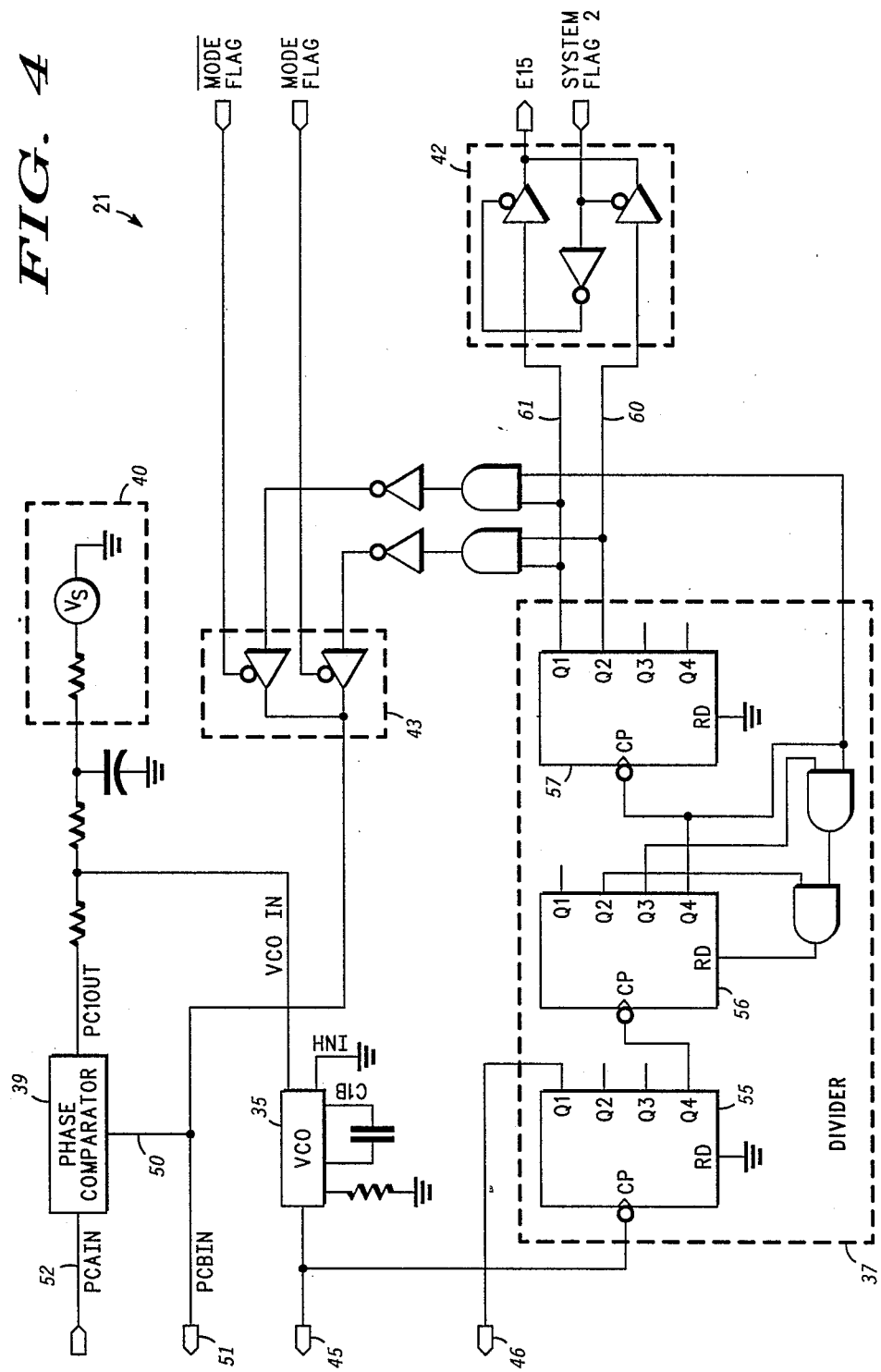
FIG. 4 is a block/schematic diagram of the phase locked loop of FIG. 3.

FIG. 4 illustrates PLL 21, which in this embodiment includes a voltage controlled oscillator (VCO) 35, a divider 37, a phase comparator 39, an offset circuit 40, and two gates 42 and 43 for gating selected signals to phase comparator 39, horizontal counter 24 and vertical counter 25. VCO 35 has an output 45 which in this embodiment supplies approximately a 14 MHz signal to horizontal counter 24 and to divider 37. Divider 37 provides two output signals which are approximately 15 KHz and 31 KHz, respectively. The two output signals are supplied directly to inputs of gate 42 and through AND gates and inverters to inputs of gate 43. A MODE FLAG and the inverse thereof is supplied to gate 43 from system/mode detection circuit 22 and is used to select either the 15 KHz signal or the 31 KHz signal from divider 37. The selected signal from gate 43 is supplied to a first input terminal 50 of phase comparator 39 and is also supplied as a clock or synchronizing signal to an output terminal 51, which is connected to horizontal counter 24. The horizontal flyback pulse is applied to a second input terminal 52 of phase comparator 39 and the phase of the two input signals is compared. Any error in phase appears as a control signal at an output of phase comparator 39 and is applied to a control input of VCO 35 to control the output frequency thereof. Because of the locking action of PLL 21 the present apparatus will lock onto any of the multistandard television signals and is also capable of being synchronized with all non-standard video signals, such as signals from a VCR, TVR, laser disc, TV games, personal computers, etc.

In one embodiment a HC 4046, sold commercially by the RCA Corp., digital phase detector II, is used as phase comparator 39. The detector compares the rising edges of the two input pulses and produces a phase difference pulse which after filtering is injected into the control input of VCO 35 to correct the output frequency thereof every horizontal cycle. The rising edges of the two input pulses will be superimposed if both input pulses are in equal frequency and phase. Actually, phase jittering of both input pulses occurs when both rising edges are superimposed and this area is called the dead band of the digital phase detector. Phase jittering occurs when the rising edges of the two pulses are superimposed because the phase polarity of the output pulse is continually reversed. The result of the phase reveals on the on screen display is to split the characters into displaced parts. Ideally the phase detector should operate in the analog region on one side or the other of the dead band.

To solve this problem offset circuit 40 is attached to the control input of VCO 35. This ideally should be a current generator connected to the PLL output or VCO input but, in this specific embodiment offset circuit 40 includes a source of substantially constant current, which is a high value resistor connected to a voltage source. With a suitable amount of DC current, for example 3 microamps, injected into the control input of VCO 35, the input pulses applied to input terminal 52 are delayed a constant 4.5 microseconds relative to the input pulses applied to input terminal 50. This moves both leading edges away form the dead band and all characters are free from jitter. The magnitude of the injected current offsets the pulse applied to terminal 50 with reference to the pulse applied to terminal 52 and produces a negative output pulse from phase comparator 39 when current is injected and a positive output pulse (the pulse on terminal 50 will lag the pulse on terminal 52) when current is withdrawn. The larger the injected (or withdrawn) current the wider will be the negative (or positive pulse. Also, the magnitude of the current applied to the control input of VCO 35 changes the centering of the character display on the television screen. In the present embodiment it was determined that a negative pulse of 4.5 microseconds gives the best result.

Divider 37 includes a divide by 16 section 55, a divide by 14 section 56, and a divide by 2 and 4 section 57. Section 57 has two output terminals 60 and 61 having output signals thereon of approximately 15 KHz and 31 KHz, respectively. Gate 42 selects one of the two output signals in response to the application of a SYSTEM FLAG 2 (a digital one or zero) thereto, and applies the selected signal to vertical counter 25. Gate 43 selectes one of the two output signals in response to the application of a MODE FLAG or an inverse MODE FLAG thereto and supplies the selected signal to input 50 of phase comparator 39 and to horizontal counter 24.

Figure 5:
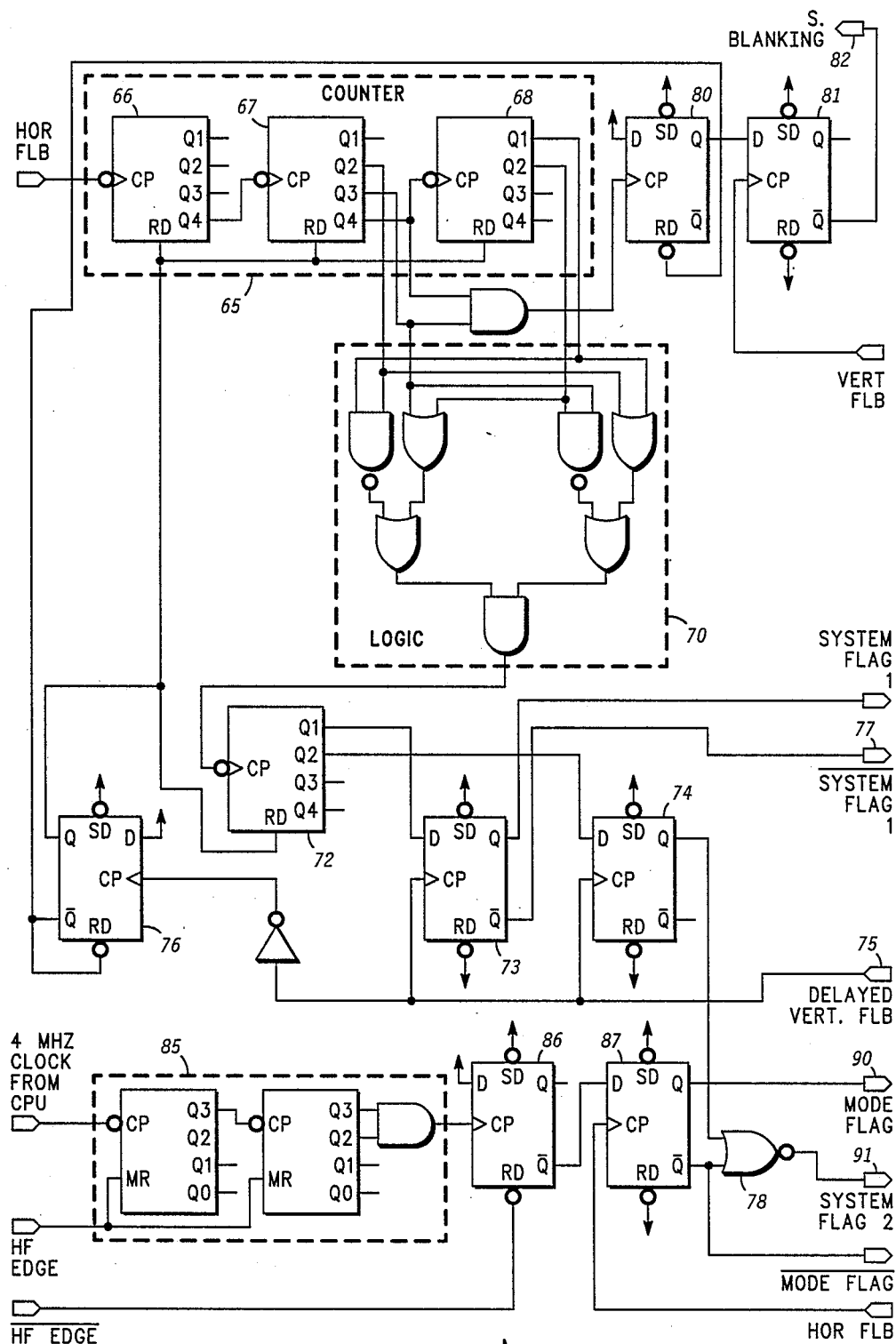
FIG. 5 is a block/schematic diagram of the multi-system detection circuit of FIG. 3.

Referring to FIG. 5 a more detailed block diagram of system/mode detection circuitry 22 is illustrated. The basic concept of circuitry 22 is to count the number of horizontal lines between consecutive vertical flyback pulses to obtain the vertical frequency and to measure the length of a horizontal line between consecutive horizontal flyback pulses in terms of a fixed frequency to obtain the horizontal frequency. To provide the horizontal line count, horizontal flyback pulses from the received signal are supplied to the clock input of a counter 65 having three sections, 66, 67, and 68, respectively. Section 66 divides the horizontal flyback pulses by 16, section 67 divides by 4/8/16 and section 68 divides by 2/4. The various outputs of sections 67 and 68 are applied to a logic circuit 70 which determines which of the below listed windows includes the measured number of lines.

| | Predefined Line Number Windows |
|---|---|
| 0-192 | Abnormal line number, all outputs blanked |
| 192-288 | 15750/60Hz |
| 288-416 | 15625/50Hz or 31250/100Hz |
| 416-576 | 31.5KHz/60Hz or 33.75KHz/60Hz (Japanese 1125 line HDTV) |
| 576-704 | 31.25KHz/50Hz |

The output pulses from logic circuit 70 are applied to a one stage counter 72 which provides no output if the line number is between 192-288 (15 K/60 Hz); counter 72 provides an output to a flip-flop 73 if the line number is between 288-416 (15 K/50 Hz or 31 K/100 Hz); and counter 72 provides an output to a flip-flop 74 if the line number is between 416-576 (31 K/60 Hz); and counter 72 provides an output to both flip-flop 73 and 74 if the line number is between 576-704 (31 K/50 Hz).

Vertical flyback pulses are applied to an input terminal 75, which is connected to the clock inputs of flip-flops 73 and 74 and through an invertor to the clock input of a flip-flop 76. Since the flip-flops are clocked on the rising edge of a pulse, inverting the delayed vertical flyback pulse clocks flip-flop 76 at the end of the flyback time. Also, a delayed vertical flyback pulse may be used to insure that the count is only for the length of the display. Clocking flip-flop 76 produces an output signal which resets sections 66, 67, and 68 of counter 65 and counter 72. Thus, these counters begin counting at the end of the first delayed vertical flyback pulse.

When the second consecutive delayed vertical flyback pulse is applied to terminal 75, the leading edge clocks output signals from counter 72 into flip-flops 73 and 74. If an output signal from counter 72 is clocked into flip-flop 73 an inverted system flag 1 is supplied to an output terminal 77. If an output signal from counter 72 is clocked into flip-flop 74 a signal is applied to one input of a NOR gate 78. The trailing edge of the second delayed vertical flyback pulse switches flip-flop 76, which causes the inverted output thereof to reset flip-flop 76 and a flip-flop 80. Flip-flop 80 is connected through an AND gate to the 8/16 outputs of section 87 of counter 65 and provides a signal when the number of horizontal lines counted is less than 192. As stated in the above chart, this low count indicates an abnormal line number. Signals from flip-flop 80 are clocked into a flip-flop 81 by the rising edge of the second vertical flyback pulse and flip-flop 81 provides a blanking signal on an output terminal 82, which blanking signal is applied to color decoder 13 (see FIG. 1).

To measure the horizontal frequency, a fixed frequency, in this embodiment a 4 MHz clock signal from CPU 17, is supplied to the clock input of a two stage counter 85 (divide by 96). A signal, HF-EDGE, which is generated by clocking a flip-flop (not shown) with the horizontal flyback pulse, is used to reset counter 85 so that it starts counting on a first horizontal flyback pulse. The output of counter 85 is applied to the clock input of a flip-flop 86 (divide by 2), which is reset by an inverted HF-EDGE pulse. The inverted output of flip-flop 86 is applied to the input of a flip-flop 87 which is clocked by the leading edge of a horizontal flyback pulse. The output of flip-flop 87 is the MODE FLAG and is supplied to and output terminal 90 which is connected to PLL 21 and horizontal counter 24. The inverted output of flip-flop 87 is connected to a second input of NOR gate 78, the output of which is SYSTEM FLAG 2 and is supplied to an output terminal 91, which is connected to PLL 21. In the present embodiment, SYSTEM FLAG 2 is normally a digital low or zero signal and is only high or a one when a European 100 HZ television signal is received. The MODE FLAG is a low or zero when a television signal with a horizontal frequency less than 20 KHz is received and a high or one when a television signal with a horizontal frequency greater than 21 KHz is received. SYSTEM FLAG 1 is a low or zero when the vertical frequency of the received television signal is 60 Hz and a high or one when the vertical frequency is 50 Hz or 100 Hz.

Table-I lists the relations of FLAGS corresponding to different system frequencies.

TABLE I

|  | SF1 | SF2 | Mode Flag |
|---|---|---|---|
| 15K/50Hz | 1 | 0 | 0 |
| 15K/60Hz | 0 | 0 | 0 |
| 31K/50Hz | 1 | 0 | 1 |
| 31K/60Hz | 0 | 0 | 1 |
| 33.7K/60Hz | 0 | 0 | 1 |
| 31K/100Hz | 1 | 1 | 1 |

Thus, system/mode detection circuitry 22 determines the exact multistandard television signal being received by accurately measuring the number of horizontal lines between consecutive vertical flyback pulses and the horizontal frequency represented by each horizontal line. System/mode detection circuitry 22 provides output signals that select the proper dividers in PLL 21 to provide the correct clock and/or sychronizing frequency outputs. PLL 21 is synchronized to the received signal and any jitter normally caused by a phase comparator in a PLL is removed in PLL 21. The OSD is controlled to operate with any multistandard television signal and, because of the simplicity of the circuitry, can be included on the same chip as the MPU. Further, because the OSD and MPU are on the same chip, additional saving in circuitry can be made. For example, the 25 bytes display and control RAM 30 contains all of the information necessary for one horizontal line, inlcuding data, color of the characters, color of the background, position, etc. As each line is generated to produce the display, new information is moved into the display & control RAM from the MPU for the next line. In this way the memory and information contained in the MPU can be used to a fuller extent, rather than duplicating the hardware in the OSD.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A television receiver comprising a microprocessor with multistandard on screen display circuitry on a single chip.

2. A television receiver comprising:
a microprocessor including a CPU: and
multistandard on screen display circuitry coupled to said CPU and including a phase locked loop having a plurality of selectable output signals providing a plurality of references utilized in said multistandard on screen display circuitry for operation at the various standards.

3. A television receiver as claimed in claim 2 wherein the multistand on screen display circuitry includes multisystem detection circuitry coupled to the phase locked loop circuitry for detecting a specific standard being received by said receiver and selecting predetermined ones of said phase locked loop output signals to provide appropriate references for the detected specific standard.

4. A television receiver as claimed in claim 2 wherein the phase locked loop includes a voltage controlled oscillator having a control input, a phase comparator having an output terminal coupled to the control input of said voltage controlled oscillator, and offset means coupled to said voltage controlled oscillator for providing an offset current to the control input of said voltage controlled oscillator to reduce jitter in displays produced by said multistandard on screen display.

5. A television receiver as claimed in claim 4 wherein the offset means includes a resistor connected to a voltage source for providing a substantially constant DC offset current.

6. A television receiver as claimed in claim 3 wherein the multisystem detection circuitry includes counter means coupled to receive a portion of the specific standard being received by said television receiver, the portion being received being indicative of horizontal lines in the specific standard, and said counter being constructed to count the number of horizontal lines in the specific standard and provide output signals indicative of the specific standard.

7. A television receiver as claimed in claim 6 wherein the multisystem detection circuitry further includes means for determining the approximate horizontal scan frequency by measuring the time between two consecutive horizontal flyaback pulses using a fixed frequency source.

8. A television receiver as claimed in claim 6 wherein the portion of the specific standard being received by the counter means is the horizontal flyback pulses and the counter means further includes switching means connected to receive at least two consecutive vertical flyback pulses for starting a count of the horizontal flyback pulses at the end of one vertical flyback pulse and ending the count at the beginning of the next consecutive vertical flyback pulse.

9. A television receiver for receiving a multistandard television signals including horizontal and vertical flyback pulses, said receiver comprising:
a microprocessor including a CPU: and
multistandard on screen display circuitry coupled to said CPU and including a counter connected to receive and count the horizontal flyback pulses and provide an output signal in response thereto, a first bistable circuit having an output terminal connected to reset said counter and an inverted input terminal connected to receive one of the vertical flyback pulses and provide an output signal in response to the trailing edge thereof, and a second bistable circuit having an input terminal connected to receive the output signal from said counter and further connected to have the output signal clocked therein by the application of the leading edge of a second consecutive vertical flyback pulse.

10. A television receiver as claimed in claim 9 wherein the counter further includes output logic circuitry designed to provide output signals indicative of which of the following windows a received television signal falls within: 0–192, 192–288, 288–416, 416–576, or 576–704 horizontal lines between vertical flyback pulses.

11. A television receiver as claimed in claim 9 further including a second counter connected to receive and count a fixed frequency signal, said second counter being further connected to begin counting in response to a first horizontal flyback pulse and stop counting in reponse to a second consecutive horizontal flyback pulse.

12. In television receiver including on screen display circuitry, a method of receiving multistandard television signals comprising the steps of:;
receiving a television signal;
sensing the horizontal lines per field in the received signal and the length of time of each line to determine the specific standard being received; and
adjusting the on screen display circuitry to synchronize on the received signal and to provide appropriate operating signals to provide an on screen display for the standard of the received signal.

13. A method as claimed in claim 12 wherein the adjusting step includes the further steps of utilizing a phase locked loop with selectable dividers therein and selecting the proper divider in response to the sensing step to provide output frequencies from said phase locked loop which are synchronized to portions of the received signal.

* * * * *